United States Patent [19]
Munich et al.

[11] Patent Number: 5,420,640
[45] Date of Patent: May 30, 1995

[54] MEMORY EFFICIENT METHOD AND APPARATUS FOR SYNC DETECTION

[75] Inventors: Randy K. Munich, Keswick; Tsai Lo, Thornhill; Paul D. Nicholas, Scarborough, all of Canada

[73] Assignee: Scientific-Atlanta, Inc., Norcross, Ga.

[21] Appl. No.: 160,841

[22] Filed: Dec. 3, 1993

[51] Int. Cl.⁶ ............................................. H04N 5/10
[52] U.S. Cl. .................... 348/525; 348/530; 348/526; 348/464; 371/42; 380/28
[58] Field of Search ............................... 348/525–531, 348/461, 463, 464, 465, 466, 467, 469, 470, 471, 472; H04N 5/08, 5/10, 7/13; 370/105.1, 105.4, 106; 375/113, 114, 116; 371/2.1, 2.2, 37.1, 37.9, 38.1, 42, 43, 44, 46, 47.1; 380/28, 29, 49

[56] References Cited

U.S. PATENT DOCUMENTS

| | | | |
|---|---|---|---|
| 4,356,566 | 10/1982 | Wada et al. | 375/116 |
| 4,394,642 | 7/1983 | Currie et al. | 371/40 |
| 4,740,962 | 4/1988 | Kish III | 370/102 |
| 5,008,751 | 4/1991 | Wishermann | 348/525 |

*Primary Examiner*—James J. Groody
*Assistant Examiner*—Michael H. Lee
*Attorney, Agent, or Firm*—Banner, Birch, McKie & Beckett

[57] ABSTRACT

A receiver is provided for receiving a digital data stream over a communication path. The digital data is arranged as a sequence of frames, each frame including a plurality of lines of data. The beginning of each frame is indicated by a frame synchronization word; the beginning of each line is indicated by a horizontal synchronization byte. The data is interleaved by an encoder prior to transmission. The decoder contains circuitry for locating the horizontal and frame synchronization data and contains circuitry for deinterleaving the digital data. Both the synchronization locating circuitry and the deinterleaving circuitry require access to a memory, but not at the same time. Therefore, a single memory is used with the synchronization recovery circuitry and deinterleaving circuitry alternately addressing the memory.

24 Claims, 12 Drawing Sheets

| | 0,0 | 0,1 | 0,2 | 0,3 | 0,4 | ... | 0,n | R(0) |
|---|---|---|---|---|---|---|---|---|
| | 1,0 | | | | | | 1,n | R(0) |
| | 2,0 | | | | | | 2,n | R(1) |
| | 3,0 | | | | | | | R(1) |
| | 4,0 | | | | | | | R(2) |
| | 5,0 | | | | | | | R(2) |
| | ... | | | | | | | R(m/2−1) |
| | | | | | | | | r(0),L |
| | m,0 | m,1 | m,2 | ... | m,n−32 | ... | m−1,n | na |
| | | | | | | m−1,33 | na | na |

FIG. 12

| FSYNC | 0,0 | 0,1 | 0,2 | 0,3 | 0,4 | 0,5 | ... | 0,L |
|---|---|---|---|---|---|---|---|---|
| | 1,0 | 1,1 | 1,2 | 1,3 | | | | |
| ... | | 3,1 | | | | | | |
| ... | | 4,1 | | | | | | |
| 6 | 0,n | | | | | | | |
| 6 | 1,n | | | | | | | |
| R(0) | | | | | | | | |
| R(1) | | | | | | | | |
| R(2) | | | | | | | | |
| R(m/2−1) | | | | | | | | |
| | m−1,n | m,0 | m,1 | ... | | | | m,n−32 |

MEMORY EFFICIENT METHOD AND APPARATUS FOR SYNC DETECTION

This application is related to the following applications: Ser. No. 161,159, filed Dec. 3, 1993 entitled "Multi-Service Data Receiver Architecture" and Ser. No. 161,160, filed Dec. 3, 1993 entitled "System and Method for Transmitting a Plurality of Digital Services Including Imaging Services", filed concurrently herewith.

BACKGROUND OF THE INVENTION

A. Field of the Invention

The present invention relates to digital signal transmission and reception, and more particularly, to a system for and method of detecting horizontal and frame synchronization in a received digital signal.

B. Description of Related Art

The background of the present invention is described herein in the context of pay television systems, such as cable television and direct broadcast satellite (DBS) systems, that distribute a variety of program services to subscribers, but the invention is by no means limited thereto except as expressly set forth in the accompanying claims.

In the pay television industry, "programmers" produce programs for distribution to various remote locations. A "program" may consist of video, audio and other related services, such as closed-captioning and teletext services. A single programmer may wish to supply many programs and services. Typically, a programmer will supply these services via satellite to individual subscribers (i.e., DBS subscribers and/or cable television operators). In the case of cable television operators, the services transmitted via satellite are received at the operator's "cable head-end" installations. A cable operator typically receives programs and other services from many programmers and then selects the programs/services it wishes to distribute to its subscribers. In addition, a cable operator may insert locally produced services at the cable-head end. The selected services and locally produced services are then transmitted to the individual subscribers via a coaxial cable distribution network. In the case of DBS subscribers, each subscriber is capable of receiving a satellite downlink from the programmers directly.

In the past, pay television systems, including cable and DBS systems, have operated in the analog domain. Recently, however, the pay television industry has begun to move toward all digital systems where prior to transmission, all analog signals are converted to digital signals. Digital signal transmission offers the advantage that digital data can be processed at both the transmission and reception ends to improve picture quality. In addition, digital data compression techniques have been developed that achieve high signal compression ratios.

In addition, there is a growing trend toward a merger of the previously separate technologies of telecommunications including voice and data telecommunications and television including satellite, broadcast and cable television. There has emerged an increased interest in developing adaptable transmission systems capable of handling any one or more of a collection or plurality of such services. The primary media investigated for providing such services to date comprise, for example, coaxial cable, land-based microwave, so-called cellular radio, broadcast FM, broadcast satellite and optical fiber, to name a few.

Each media has its own characteristics. For example, comparing cable and satellite for digital data transmission, cable tends to have a medium error rate, but, when errors appear, the errors come in long bursts. Satellite as a media has a pretty poor error rate, primarily due to the requisite weak signal power, and hence, low signal to noise ratio. In satellite, then, the poor error rate is specially corrected utilizing such techniques as convolutional error correctors, not required in a cable environment.

In copending U.S. application Ser. No. 07/968,846, filed Oct. 30, 1992 and entitled "System and Method for Transmitting a Plurality of Digital Services," there is described an encoder for generating a multiplexed data stream carrying services to remote locations via, for example, a satellite or a cable distribution network. The generated data stream comprises a continuous sequence of frames, each frame comprising two fields, and each field comprising a plurality of lines. A first group of lines of a field defines a transport layer and a second group of lines defines a service data region. A feature of the disclosed scheme is the ability to dynamically vary the multiplexed data stream from field to field. A further feature of the disclosed scheme is that the data transmission rate of the multiplexed data stream is related to the frequency of known analog video formats, i.e. frame, field and horizontal line rates.

In copending U.S. application Ser. No. 07/970,918, filed Nov. 2, 1992, entitled "System and Method for Multiplexing a Plurality of Digital Program Services for Transmission to Remote Locations," there is described another system, this for multiplexing a plurality of digital program services comprising a collection of, for example, video, audio, teletext, closed-captioning and "other data" services. According to the disclosed scheme, a plurality of subframe data streams are generated, each having a transport layer region and a program data region. These subframe data streams are then multiplexed together into superframes having a transport layer region and a subframe data region.

While these disclosed transmission systems permit a variety of services to be transmitted over various media to remote locations, there remains a need to provide yet other alternative arrangements more particularly adapted to the wide variety of services that may be offered over various media and permit the end user at the remote location greater flexibility over the data content the user is ultimately enabled to receive. Moreover, such a system should be able to be easily adapted to transmit an increasing number of different services in an increasingly efficient manner, for example, utilizing the same or less bandwidth.

Since such services as high definition color television services, so-called "surround-sound" digital audio services, interactive transactional services for home-shopping, reservations, first-run as well as classic movie programming, software delivery, interactive games, alarm services, energy management and such all involve different bandwidths, data formats and such, there remains a need for flexibility in the overall structure provided for transmitting such services. Moreover, a user should not be presented with an overwhelming number of choices, but should be able, in a user-friendly manner, to select only those services which he is capable of receiving or wants to receive. Ideally, the user should be able to have access to an infinite variety of data services, selectable as he chooses, so that he may, for example, watch a first run movie in so-called high definition format accompanied by a "surround-sound" audio in the language of his choice and, at the same time, receive a facsimile or voice communication over the same media. If the user is equipment-limited, for example, to a standard resolution television and a telephone set, the user should be able to fashion the delivery of services to the equipment he owns.

Thus, there remains a need in such systems to efficiently and as inexpensively as possible recovery synchronization and clock information from a received digital signal so that the data representing the several multiplexed data services discussed above may be demultiplexed and distributed to the user's equipment.

SUMMARY OF THE INVENTION

The problems relating to synchronization recovery are solved in accordance with the present invention by use of a synchronization recovery circuit that includes error correction circuitry and conserves memory area. The present invention is used in a system where a plurality of digital service data streams at varying data rates are multiplexed and transmitted from an origination point to a plurality of remote locations. A digital service may comprise a collection selectable by the user from any of a number of low data rate, medium data rate and high data rate services including, but not limited to, video (both standard and high resolution), audio (from monaural to "surround-sound"), and data (from subscription software to video games to high speed data-base exchanges).

The present invention is described primarily in the context of a pay television system such as a cable television or direct broadcast satellite system (DBS), that typically distribute a variety of program services to subscribers for presentation on home terminal equipment which is the property of the end user or subscriber to the pay services. Such home terminal equipment may comprise a video game apparatus, a television signal receiver (either standard or high definition), a home computer, a printer (either a facsimile or high resolution image printer), a stereo sound system, a telephone (including portable, mobile or stationary), a picture-phone, an energy system or alarm equipment interface, or any other known such apparatus or combination of apparatus. Consequently, the present invention does not only envision the environment of the present invention to be so limited but may also include the telecommunications environment or other fixed or switched one-way or two-way program apparatus. It will be assumed, however, that such services will be converted, if not already in digital form, to digital form for transmission over the present system.

Briefly stated, the present invention relates to a decoder for receiving and decoding a digital data transmission. The decoder includes at least sync recovery circuitry for establishing horizontal and frame synchronization and de-interleaving circuitry for de-interleaving the received, interleaved data. Both the sync recovery circuitry and the de-interleaving circuitry requires DRAM access. However, the sync recovery circuitry only requires access to the DRAM during initial synchronization acquisition and not during sync lock verification. The deinterleaving process can occur only after synchronization acquisition has been achieved; therefore, the de-interleaving circuitry only requires access to the DRAM subsequent to sync acquisition. Accordingly, the present invention provides for the sharing of a DRAM by a sync recovery circuit and a de-interleaving circuit. The sync recovery circuit and deinterleaving circuit sequentially access the same memory locations in the memory. Thus, memory space is conserved.

BRIEF DESCRIPTION OF THE DRAWINGS

FIGS. 9-16 illustrate the de-interleaving process of the present invention.

DETAILED DESCRIPTION OF THE DRAWINGS

According to the present invention, digital services are provided to an encoder that generates a multiplex data stream which carries the services to remote locations via a transmission medium, such as a satellite or a cable distribution network. The multiplex data stream is a continuous sequence of frames. At a decoder location synchronization is recovered so that the data may be extracted. Moreover, when the data is extracted, error protective measures taken at the encoder must be undertaken in the form of error correction at the decoder site. As will be discussed further herein, those measures include deinterleaving and Reed-Solomon decoding.

Figure 1:
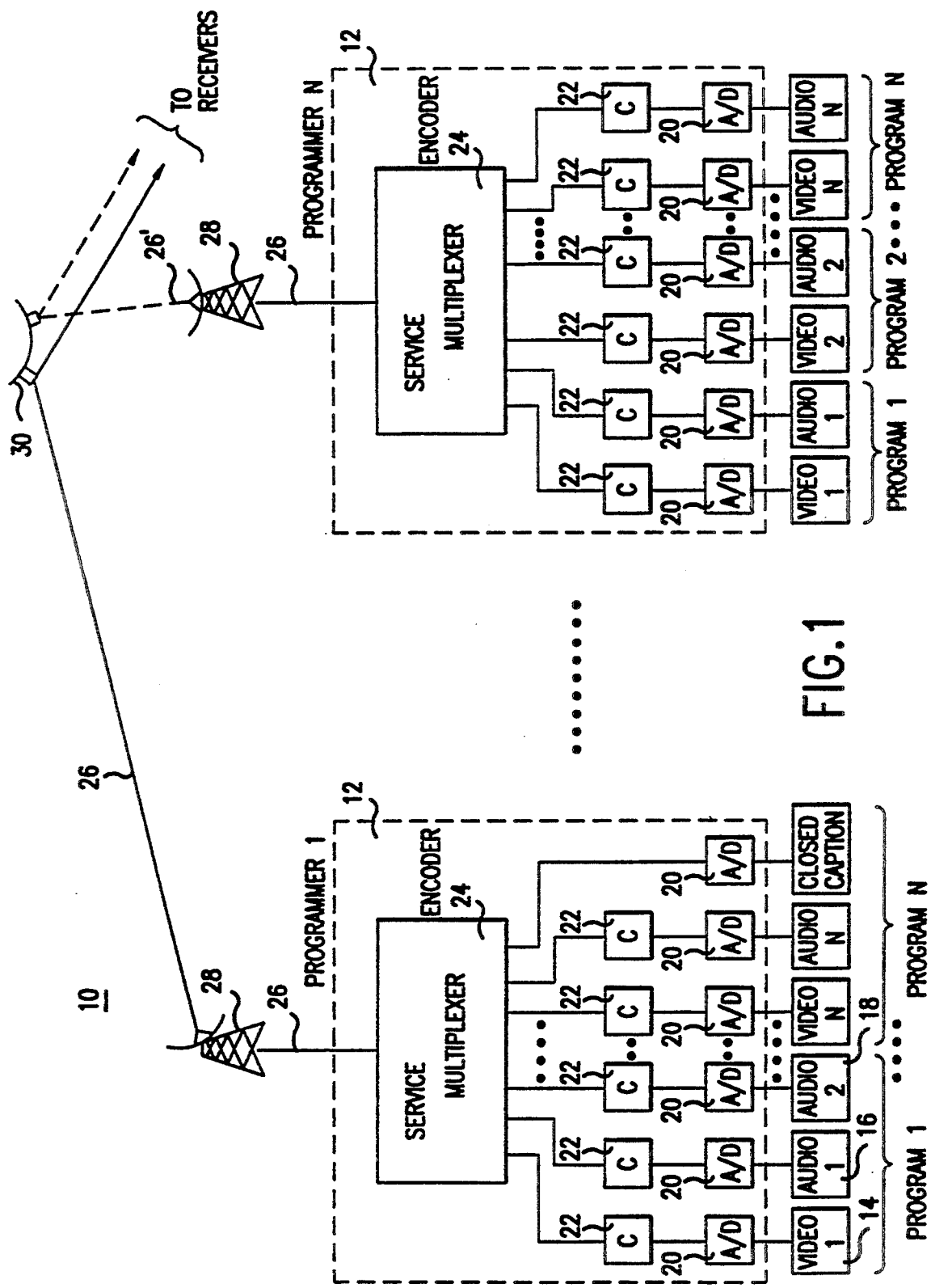
FIG. 1 shows a block diagram of a transmission system for use with the present invention.

FIG. 1 shows a partial block diagram of a system 10 for multiplexing a plurality of digital services for transmission to a plurality of remote locations (not shown). In the pay television context, the system 10 comprises a plurality of service encoders 12 each of which is operated by a "programmer." As illustrated, any number N of programmers may be present in the system 10. As mentioned in the background, programmers are entities that provide "programs" for distribution to various subscribers. For example, as shown in FIG. 1, Programmer 1 may provide programs 1 . . . N. Each program comprises a set of related services, such as video, audio, and closed-captioning services. By way of example, FIG. 1 shows that Programmer 1 is providing Program 1 which comprises a video service 14 and two related audio services 16,18. A given program can comprise a collection of related services, and a programmer may provide any number of programs.

Typically, the individual services of each program are produced in analog format. According to the system and method of the present invention, each encoder 12 has a plurality of analog-to-digital converters 20 for converting services in analog format to digital services. In addition, video and audio services may be compressed by video and audio compression devices 22; however, compression is not required. As those skilled in the art know, there are many video and audio compression techniques available. For example, the Motion Picture Expert Group (MPEG) has developed a video compression algorithm that is widely used in the digital video services industry. Vector quantization is another, more recent, compression technique for digital video. According to the present invention, any compression algorithm may be employed by the video and audio compression devices 22, and the devices 22 are by no means limited to any one compression method. Furthermore, as mentioned above, compression of audio and video services is not required. Compression merely serves to increase the amount of data that can be transmitted within a given bandwidth.

Each encoder further comprises a service multiplexer 24. The service multiplexers 24 function to multiplex the individual digital services for transmission to remote locations (not shown), such as a cable head-end installation or DBS subscriber. The service multiplexer 24 in each encoder 12 generates a multiplex data stream which is fed to a transmitter 28 for transmission to the remote locations via a satellite 30. As illustrated in FIG. 1, each programmer (e.g., Programmer 1 . . . Programmer N) provides its own multiplex data stream 25. As described hereinafter in greater detail, multiplex data streams may be received at various remote locations, such as a cable head-end, a DBS subscriber or a cable subscriber. Each remote location employs a service demultiplexer which extracts selected services from the multiplex stream.

Figure 2:
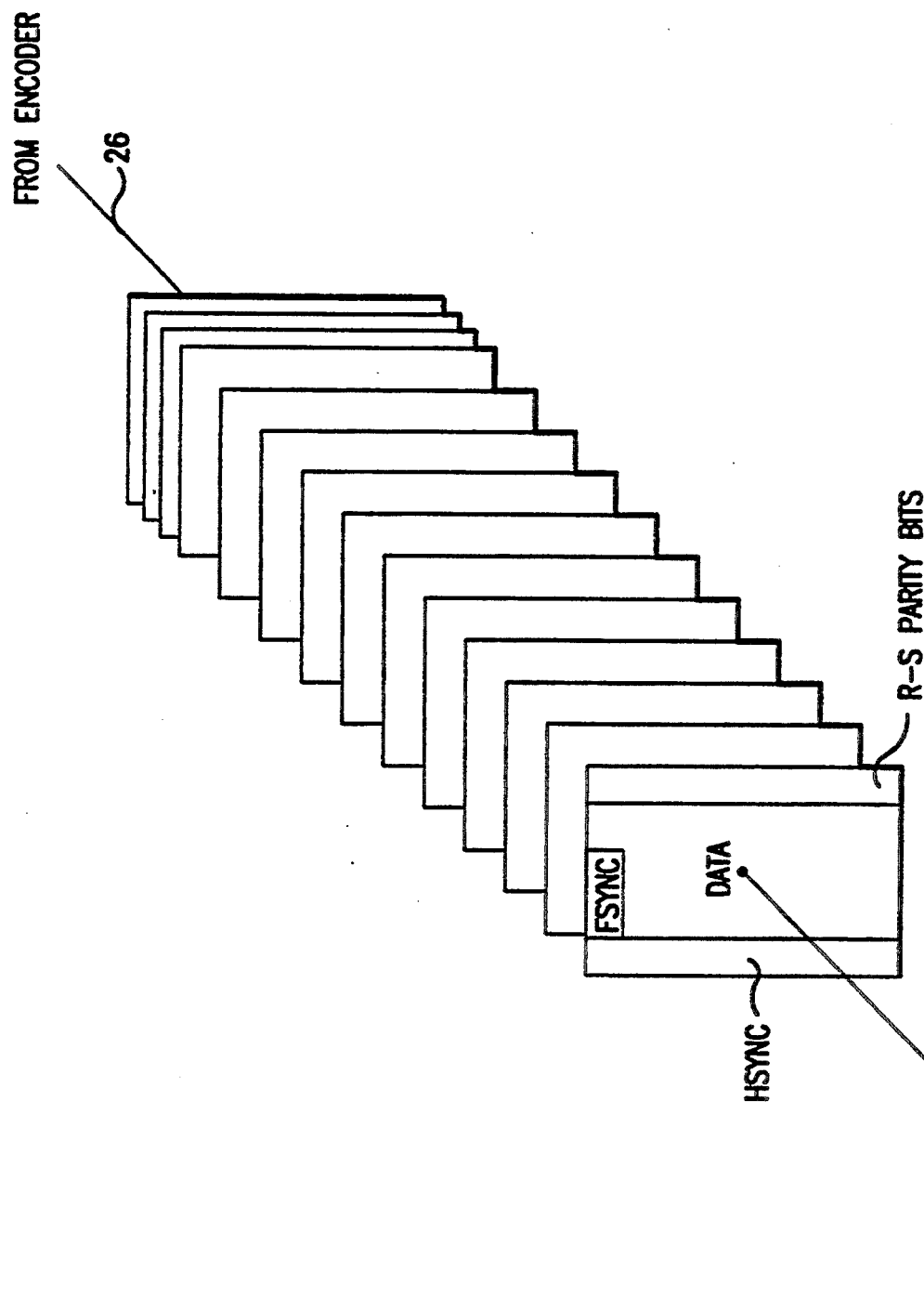
FIG. 2 shows a series of data frames for use with the present invention.

FIG. 2 is a graphical illustration of the multiplex data stream 26 generated by each service multiplexer in each encoder 12. According to the present invention, the multiplex data stream 26 comprises a continuous sequence of "frames." Each frame contains multiplexed service data (e.g., video data, audio data, teletext, etc.) and data packets that contains certain system data necessary for operating the system of the present invention.

Figure 3:
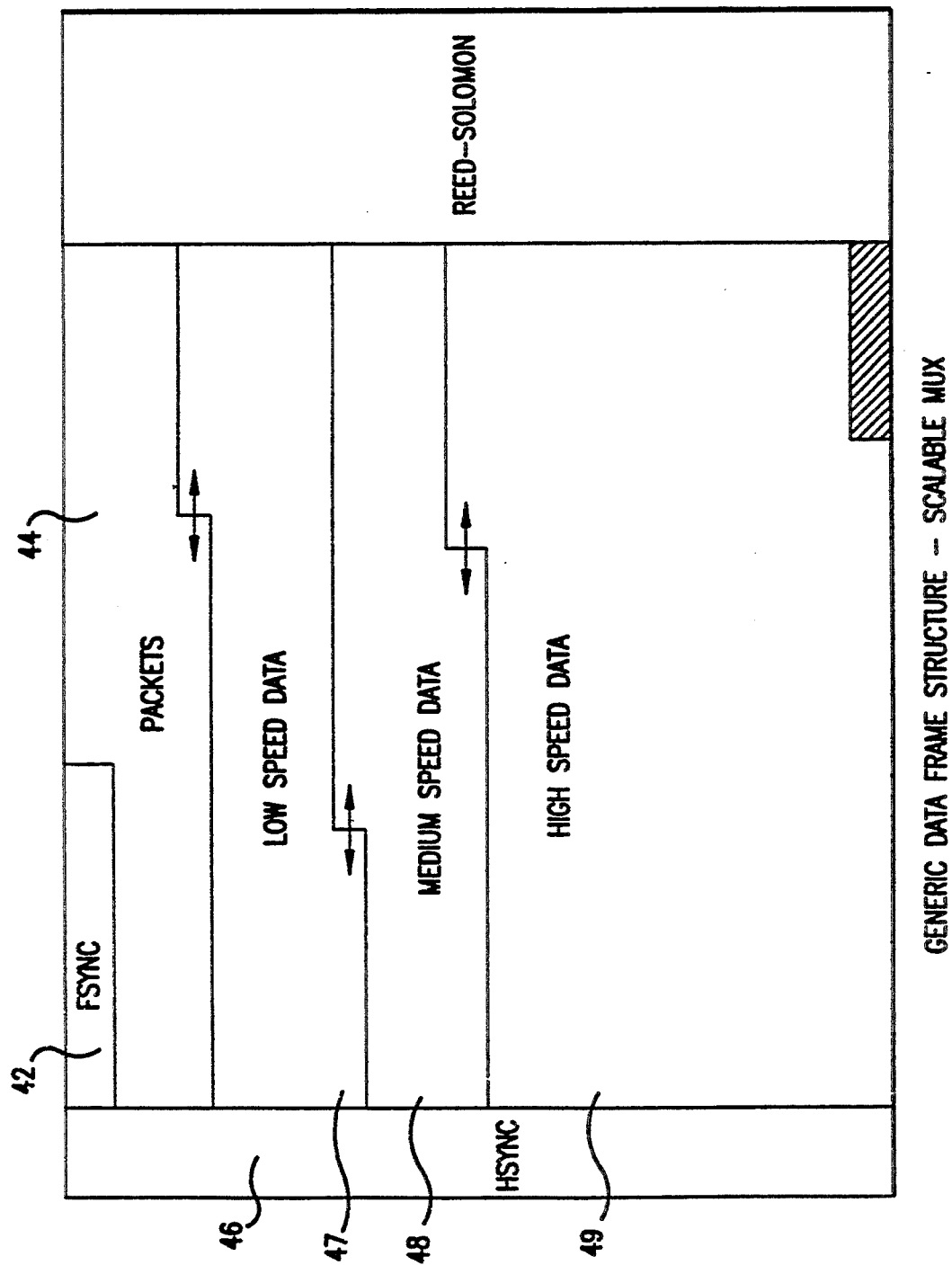
FIG. 3 shows the arrangement of a data frame for use with the present invention.

FIG. 3 shows the general arrangement and contents of a frame of the multiplex data stream of FIG. 2. As illustrated in FIG. 3, a frame comprises a plurality of rows each of which contains a plurality of bytes. The number of rows is programmable and may be up to 512 rows. The number of bytes is also programmable and the rows may be up to 256 bytes long in the preferred embodiment. Referring to FIG. 3, each frame begins with a frame sync word ("FSYNC") 42, and each line begins with an horizontal sync byte ("HSYNC") 46. As described hereinafter, a service demultiplexer in a decoder at each subscriber location uses the HSYNC and FSYNC patterns to establish line and frame synchronization after receiving a multiplex data stream. The FSYNC word in each field is followed by data packets 44. In general, data packets 44 in each field contains system data needed for operation of the system. The data packets 44 of each frame are followed by low speed data 47, medium speed data 48 and high speed data 49, which contain the transmitted services. The arrows shown in FIG. 3 at the transitions between packets, low speed dam, medium speed data and high speed data indicate that the boundaries are flexible and can change from frame to frame.

Figure 4:
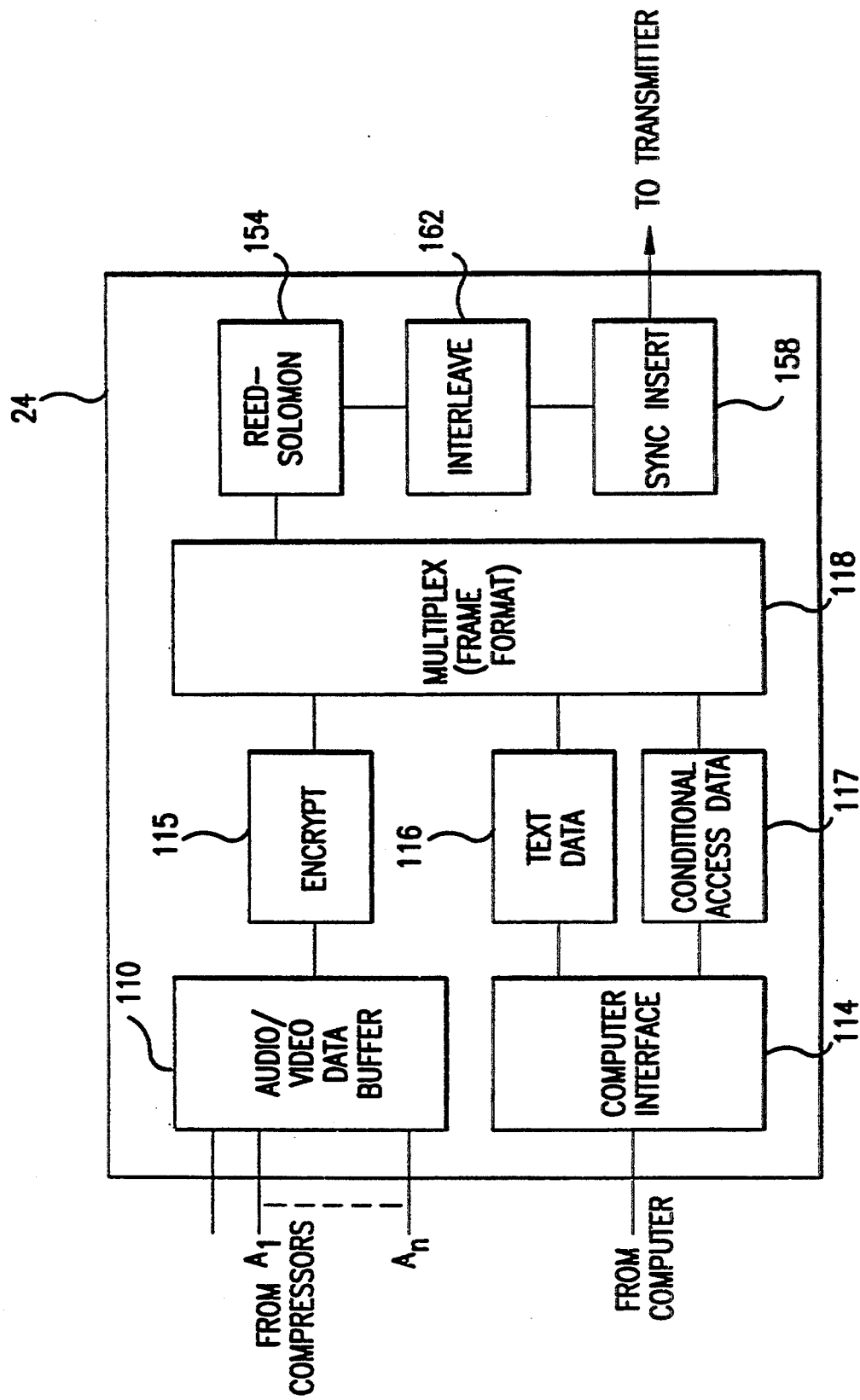
FIG. 4 shows a service multiplexer for use with the present invention.

FIG. 4 is a block diagram of a service multiplexer for use with the instant invention. Service multiplexer 24 operates to multiplex a plurality of digital services for transmission to remote locations (not shown). As shown in the Figure, a plurality of audio and video services are input to audio/video data buffer 110. Other digital data, such as text data, is input from a computer to computer interface 114 of the service multiplexer. The output of audio/video data buffer 110 is input to an encrypt circuit 115. The computer interface divides the incoming data into either text data, which enters text data processing block 116 or conditional access data, which enters conditional access data processing block 117. The output of encrypt circuit 115, text data block 116 and conditional access data block 117 is input to multiplexer 118, which multiplexes the various data services into a single data stream. The output of multiplexer 118 is fed to Reed Solomon circuit 154. The Reed Solomon error correction codes are added to the digital stream in this block. The output of Reed Solomon circuit 154 is input to interleave circuit 162.

The interleave circuit 162 interleaves the data frame by transposing the row and column addresses of data within the frame according to a predetermined algorithm. Data from interleave circuit 162 is then passed to sync insert circuit 158 where horizontal synchronization bytes and frame synchronization words are inserted to form data frames. The output of sync insert circuit 158 is passed to a transmitter for transmission to the receivers. As described above, the transmission may occur by satellite or cable system. More details of the service multiplexer may be found in application Ser. No. 161,160, filed Dec. 3, 1993 entitled "System and Method for Transmitting a Plurality of Digital Services Including Imaging Services", which is expressly incorporated by reference herein.

Figure 5:
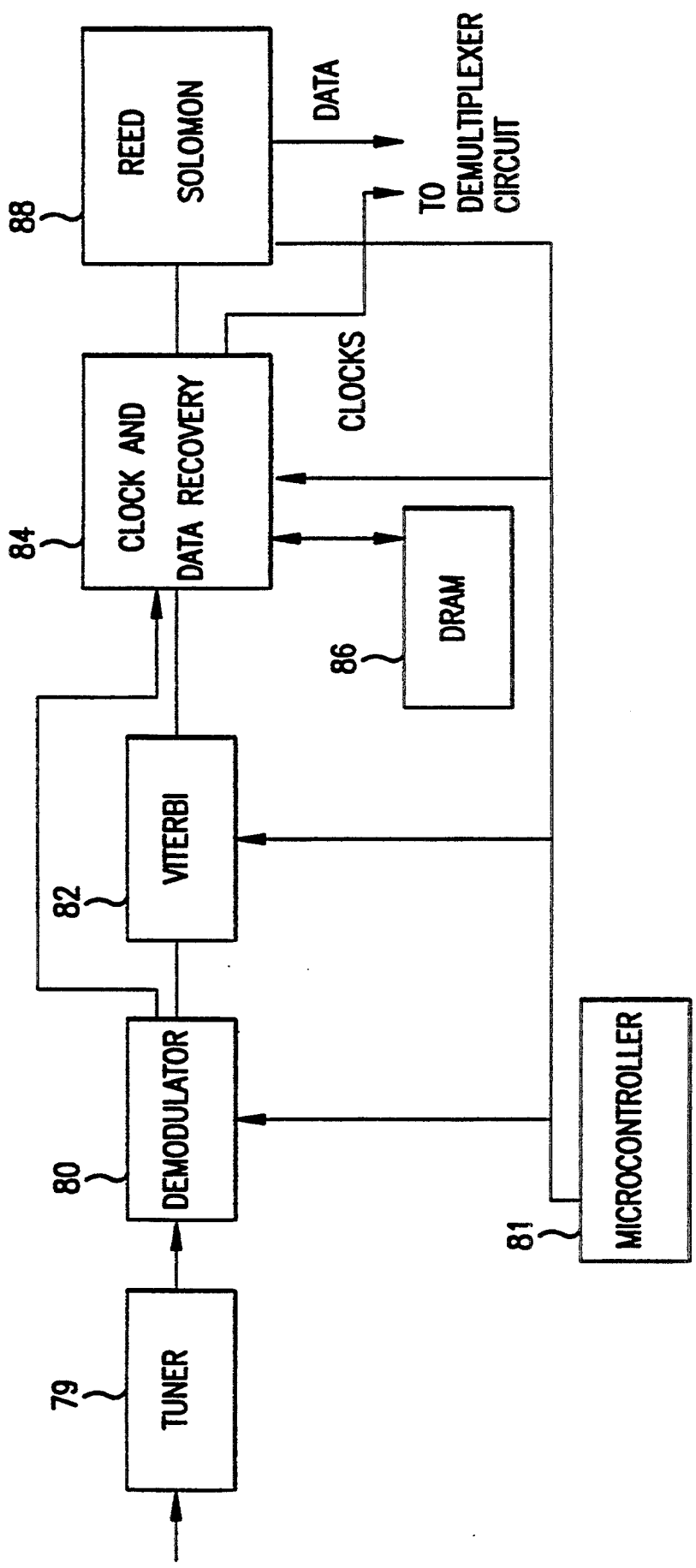
FIG. 5 shows a receiver in accordance with the present invention.

FIG. 5 is block diagram of a receiver in accordance with the present invention. Microcontroller 81 controls demodulator 80, Viterbi circuit 82, clock and data recovery circuit 84 and Reed Solomon circuit 88 in accordance with the invention. A data stream received from the satellite or cable system is tuned by tuner 79 and then demodulated by a demodulator 80. The demodulated data stream is passed to a Viterbi circuit 82 for error correction. The error corrected signal is passed to clock and data recovery circuit 84, which communicates with DRAM 86. The output of clock and data recovery circuit 84 is 1) digital service data, which is passed to Reed Solomon circuit 88 for error correction decoding and 2) clocks. The data from Reed Solomon circuit 88 and the clocks are passed to a demultiplexer circuit described in more detail in application Ser. No. 161,159, filed Dec. 3, 1993 entitled "Multi-Service Data Receiver Architecture", which is expressly incorporated herein by reference.

DRAM 86 is preferably a 256 k×16 DRAM with 80 ns access time. No refresh is necessary for DRAMs with 4 ms refresh time as long as the data rate is 4.0 Mbps or more. For data rates of less than 4.0 Mbps, the DRAM refresh rate should be at least 16 ms.

Figure 6:
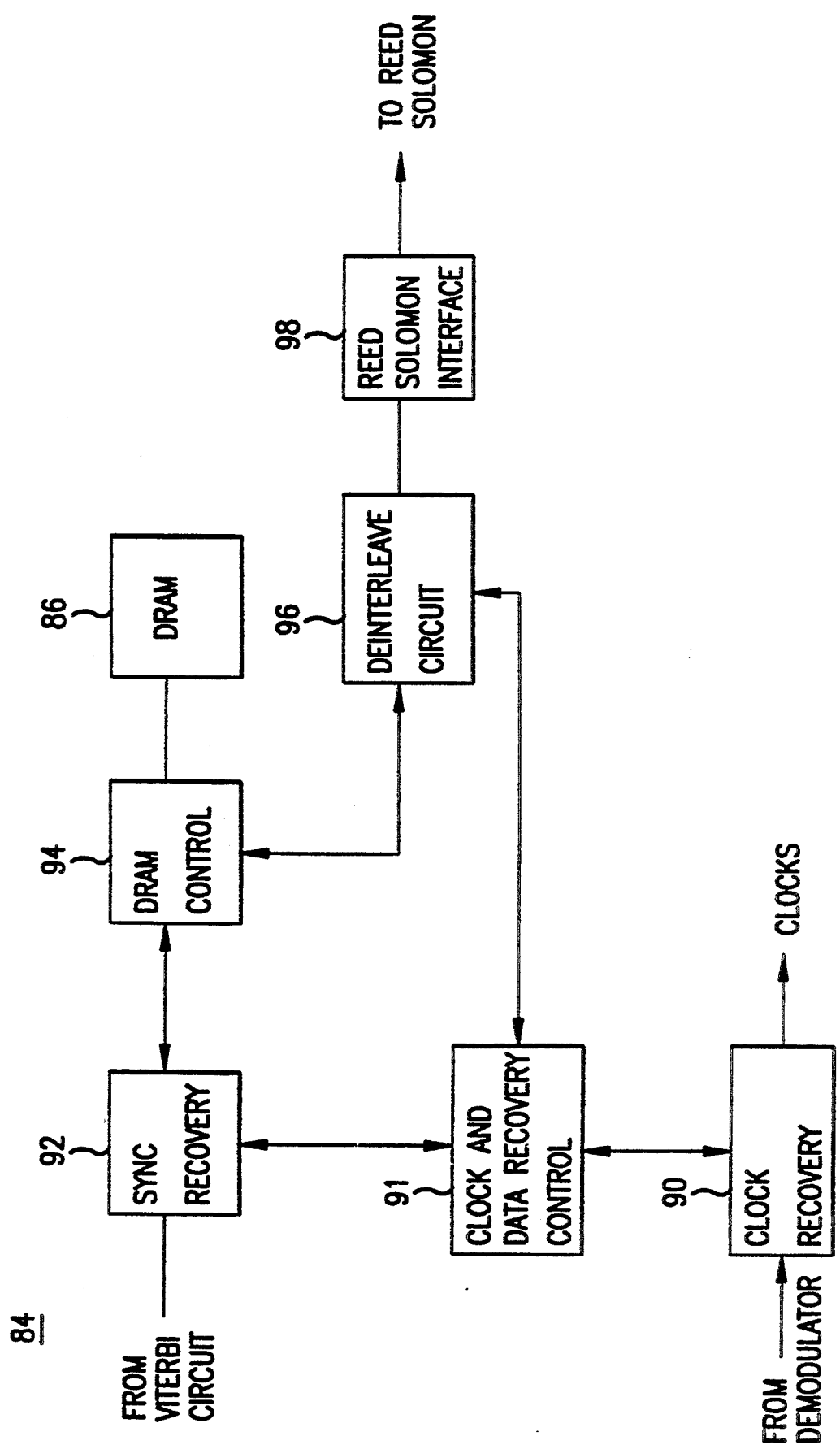
FIG. 6 shows a clock and data recovery circuit in accordance with the present invention.

FIG. 6 is a block diagram of clock and data recovery circuit 84. The clock and data recovery circuit 84 consists of two sections: a clock recovery section and a data recovery section. The clock recovery circuit 90 receives data from the demodulator and recovers various clocks needed for operation of the system. The data recovery block performs two functions. The sync recovery circuit 92 recovers horizontal and frame synchronization. The deinterleave circuit 96 deinterleaves the received data to recover an original signal. The deinterleaved data is then passed to Reed Solomon interface 98. The output of Reed Solomon interface 98 is then passed to the Reed Solomon circuit 88, shown in FIG. 5. DRAM control 94 connects with sync recovery circuit 92 and deinterleave circuit 96 and controls DRAM 86. Clock and Data Recovery Control 91 controls the operation of both the clock recovery section and data recovery section.

Figure 7:
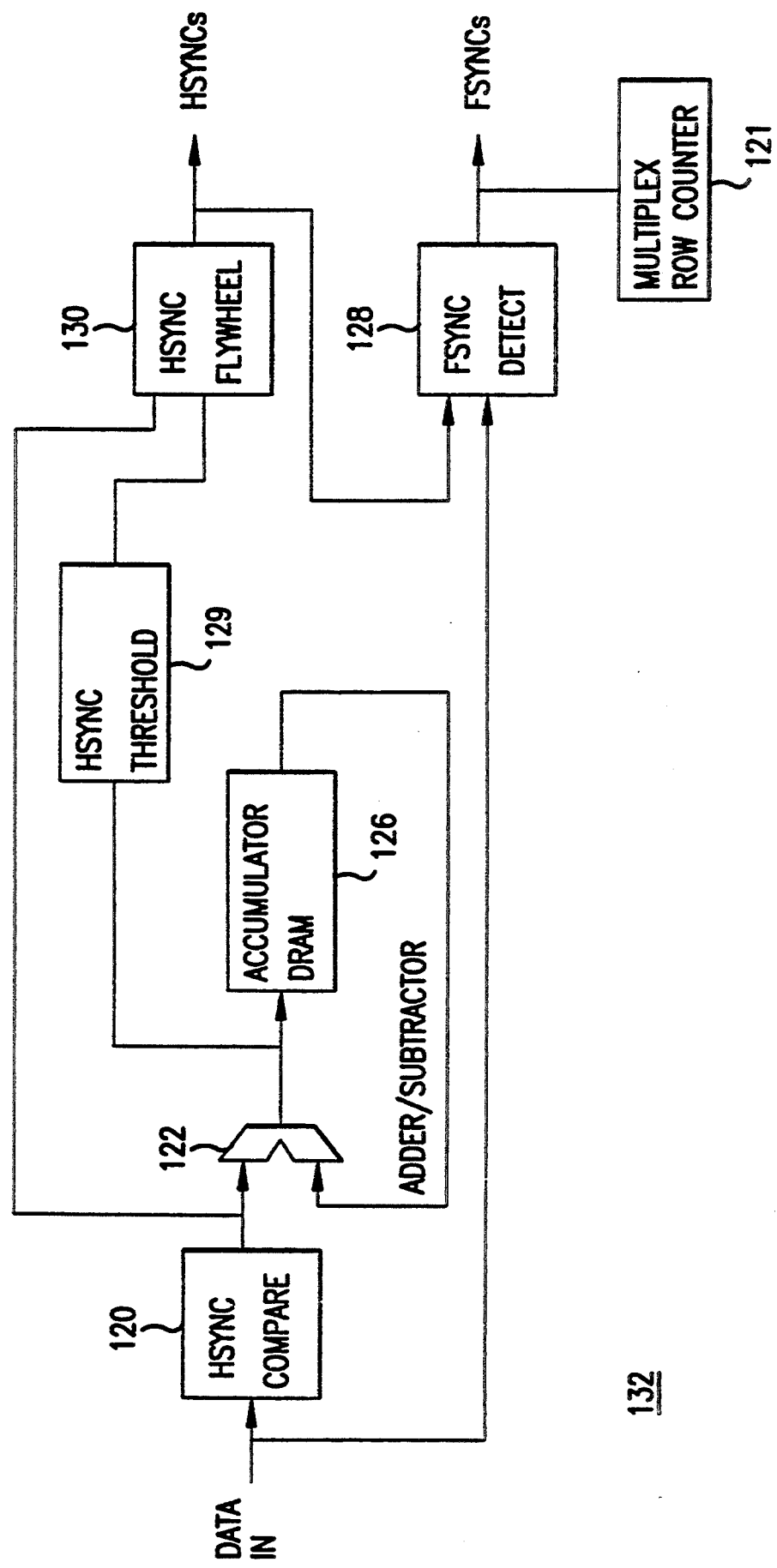
FIG. 7 shows a sync recovery circuit in accordance with the present invention.

The sync recovery circuit will be described in more detail by reference to FIG. 7, which is a block diagram of the sync recovery circuit. A data stream is received by HSYNC compare circuit 120. In HSYNC compare circuit 120, successive comparisons between the received data and the HSYNC byte are made. When a match between the data and the HSYNC byte is found, a true or "1" is output from HSYNC compare circuit 120. Otherwise, a false or "0" is output from HSYNC compare 120. The output of HSYNC compare 120 is then added by adder/subtractor 122 to the data held in and read from accumulator DRAM 126, the result of the addition being stored in accumulator 126. As a result, accumulator 126 keeps a running count of the number of HSYNC patterns found by the HSYNC compare circuit 120. When a threshold number of matches have been found, HSYNC threshold circuit 129 is activated and the sync recovery circuit 132 assumes that it has obtained horizontal synchronization. The threshold count is programmable from 1 to 15 in a preferred embodiment. At this point, a column reset is output to the column counter, which is located in HSYNC Flywheel 130. The column counter is thus synchronized with the occurrence of the HSYNC bytes. That is, overflow of the column counter indicates the location where an HSYNC byte appears in the multiplex data stream. At this point, the DRAM is released by the sync recovery circuit. The DRAM is then free for use by the deinterleave circuit 96, which will be described later.

As stated above, after the requisite number of matches between the HSYNC word and received data have been found, the sync recovery circuit assumes it has established horizontal synchronization and that the output of HSYNC Flywheel 130 indicates the occurrence of HSYNC bytes in the multiplex data stream. The sync recovery circuit then proceeds to locate frame synchronization.

FSYNC words must follow HSYNC bytes. Therefore, the output of HSYNC Flywheel 130 is used to reset FSYNC detect circuit 128. FSYNC detect circuit 128 locates the FSYNC word by comparing the received multiplex data stream with a pseudo-random bit stream generated by the FSYNC detect circuit 128 that is representative of the FSYNC word.

Figure 8:
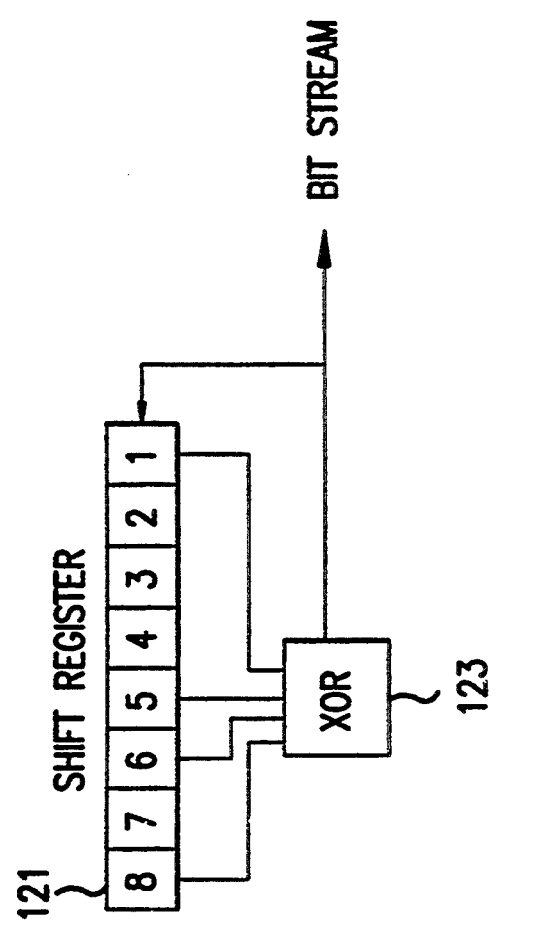
FIG. 8 shows a pseudo-random bit stream generator for use with the instant invention.

In a preferred embodiment, the pseudo-random bit stream is generated using the polynomial $X^8+X^6+X^5+X+1$. Referring to FIG. 8, an 8-bit shift register 121 is shown. Shift register 121 is initially set such that bit 1 is 1 and all other bits are zeros. Bits 1, 5, 6 and 8 are input to XOR gate 123, the, output of which is input to shift register 121 to be shifted into bit 1 of the shift register on the next count. The output of XOR gate 123 is a pseudo-random bit stream representative of the FSYNC word. This bit stream is compared to the received bit stream from the multiplexed data stream. If a match of a threshold number of bits out of the 512 bits is successful, then a valid FSYNC has been found. The FSYNC is used to reset the mux row counter 121, indicating a new frame.

Once horizontal synchronization has been acquired, the HSYNC Flywheel continues to check to assures that synchronization is not lost. Referring again to FIG. 7, HSYNC Flywheel 130 receives data from HSYNC Compare 120. Thus, HSYNC Flywheel 130 can determine whether HSYNCs are actually occurring where its internal counter indicates that they should be occurring. If an HSYNC word appears at that location, a count is incremented. If it does not appear, a count is decremented. After a predetermined number of failures to find a sync word where it should appear, the sync recovery circuit assumes that it has lost synchronization and reverts to the accumulation method described above. That is, the sync recovery circuit again searches for HSYNC bytes in the data stream using HSYNC compare 120, adder/subtractor 122 and accumulator 126.

The horizontal recovery process is limited by the DRAM access time. To avoid the expense of a very high access speed DRAM, a lower speed DRAM may be chosen and the data under sampled by every 8th bit. This reduces the needed DRAM access time to a manageable level. Of course, the drawback is that more rows must be analyzed to find the HSYNC pattern than would be required with full sampling.

As described above, clock and data recovery circuit 84 includes deinterleave circuit 96 as shown in FIG. 6. As previously described in regard to FIG. 4, the transmitted data is interleaved before transmission for error correction purposes. Therefore, the received data must be deinterleaved. The deinterleaving process transposes the row and column address when writing data into the DRAM according to a predetermined algorithm. The frame is read out of the DRAM in sequential order. The deinterleaving process occurs over a Reed Solomon block size, which is the number of columns in the Reed Solomon block.

Figures 9, 10:
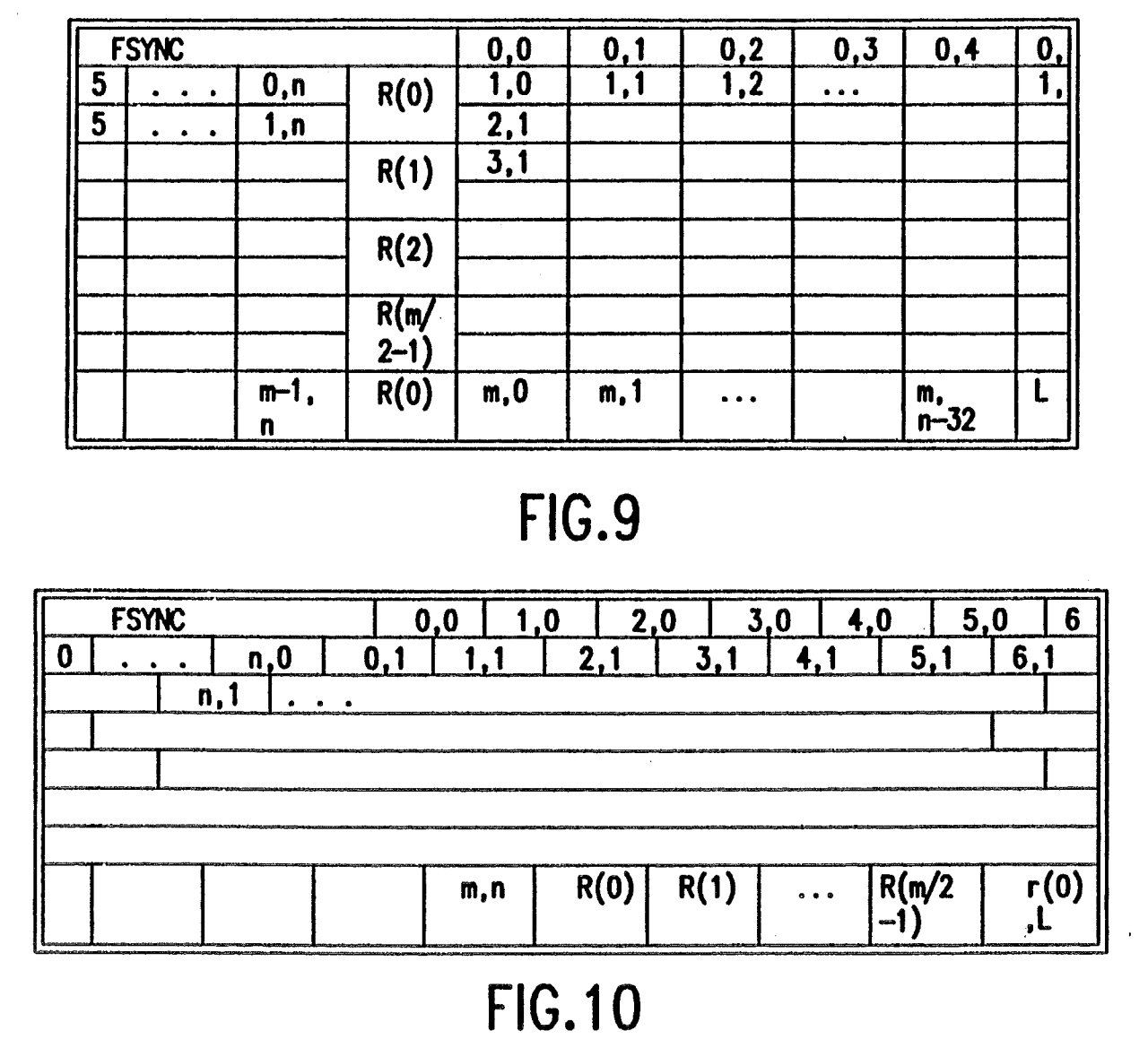

Consider the interleaved data stream shown in FIG. 10, which has an even number of row and columns. The data stream is read in from left to right. The data is written into the DRAM in a column, from top to bottom as shown in FIG. 11. The 256 k×16 DRAM has an 18 bit address space. The top 9 bits are referred as the column address and the lower 9 bits are referred as the row address. This address map can be drawn out as a square, where moving from left to fight would be incrementing the column address and moving top to bottom would be incrementing the row address. Thus, as the data stream is written into DRAM the row address increments until it reaches m (the last row), then the column address increments by one and the process repeats for the next column. To deinterleave, the data is read out of the DRAM from left to fight such that the column address is incremented as data is read (opposite to the write process). FIG. 9 is the de-interleaved data stream format (as in FIG. 3) read out of DRAM.

The even number of columns includes the HSYNC byte which is not interleaved. Thus, the interleave is really on an odd column. Since each DRAM location (represented by each row and column) contains 2 bytes of data, there will be a remainder of one byte in each row—R( ). To simplify the DRAM write process, R( ) will carry the remainder for 2 rows of data as shown in FIG. 9. The last remainder in the last row of data—r(-0)—is paired with the last data byte in the frame—L.

Figures 13, 14:
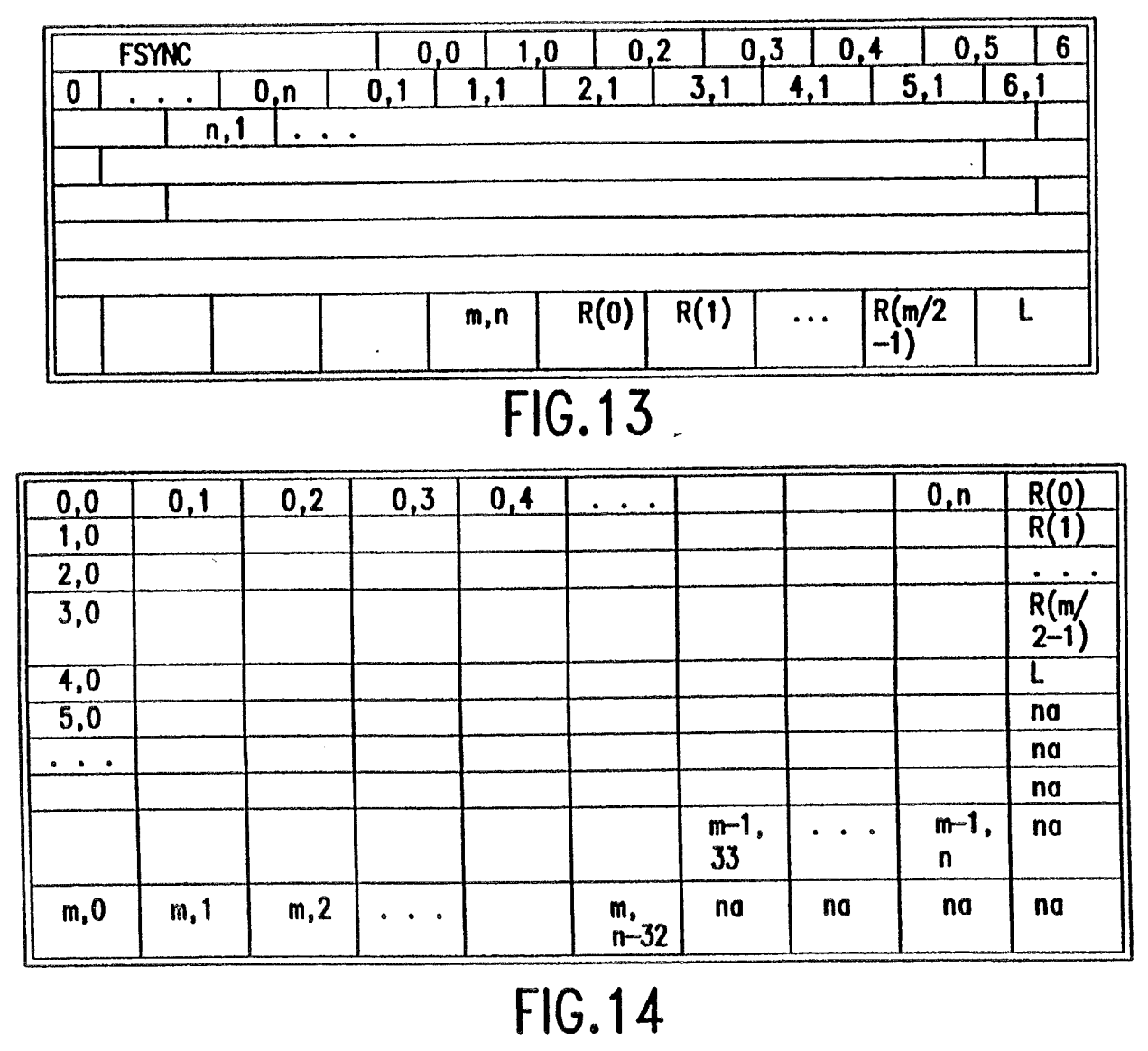

For an even number of columns and odd number of rows the process is the same as above except there is no r(0) remainder. FIG. 13 is the data frame received; FIG. 14 is the DRAM memory map and FIG. 12 is the deinterleaved data.

Figures 15, 16:
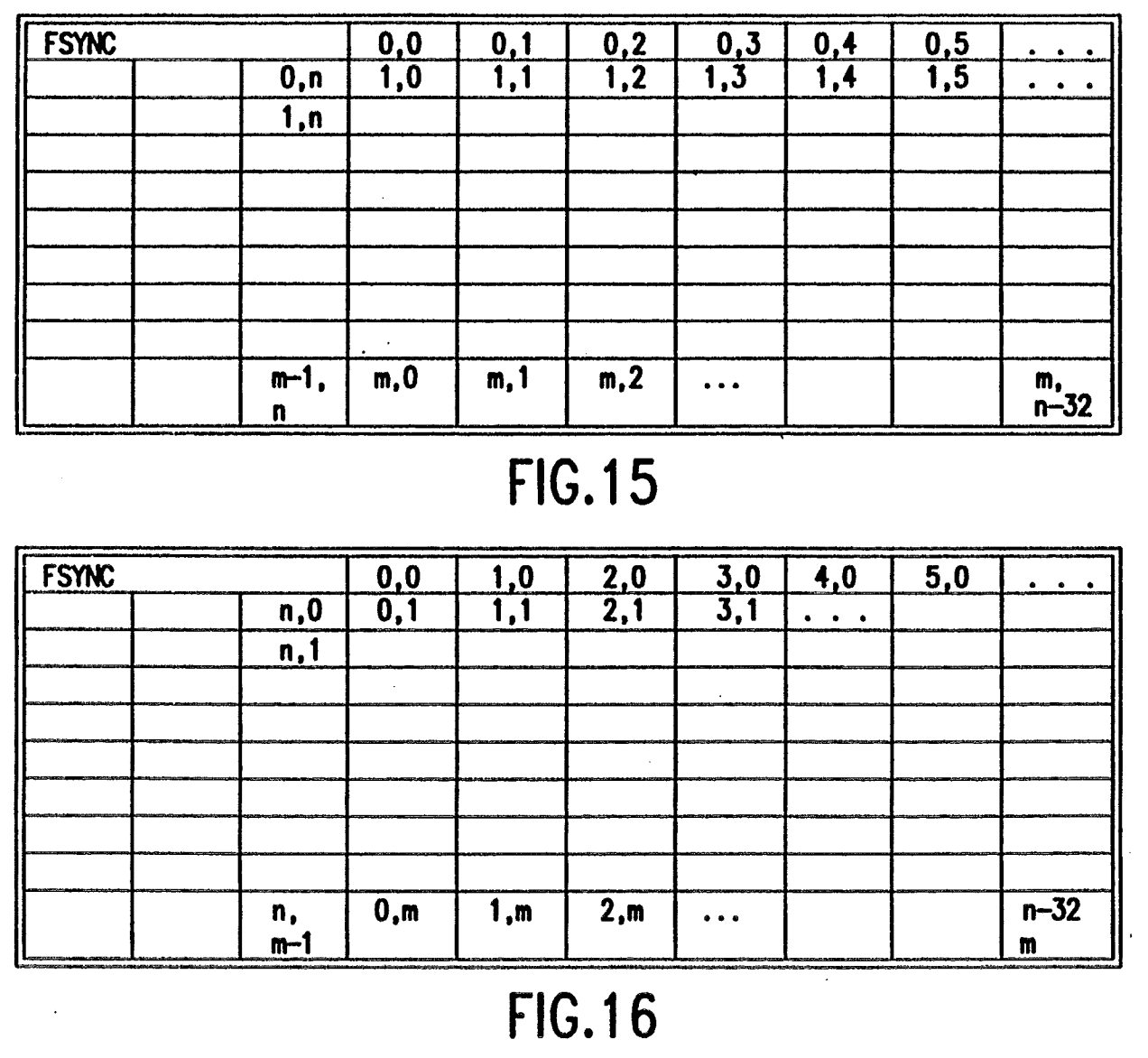

For an odd number of columns and odd number of rows the process is the same as above except there is no r(0) remainder and no R( ) remainders. FIG. 16 is the data frame received; FIG. 15 is the deinterleaved data.

After deinterleaving, the data is passed through Reed Solomon interface 98 (FIG. 6) to Reed Solomon Circuit 88 (FIG. 5). The generalized Reed Solomon circuit is well known. Its application and use in the instant invention is described in more detail in application Ser. No. 161,151, filed Dec. 3, 1993 entitled "Multi-Service Data Receiver Architecture", which is expressly incorporated herein by reference. The output of Reed Solomon circuit 88 is demultiplexed in a demultiplexer circuit (not shown) for use by the recipient of the signal, e.g., for display on a television. Of course, conversion of the digital data to analog data will generally be required before use by the recipient.

While the invention has been described in detail with reference to the appended drawing, the invention is limited in scope only by the claims. Moreover, any application cited herein should be construed to be incorporated by reference as to any subject matter deemed essential to the present disclosure.

We claim:

1. A receiver for receiving a digital signal transmitted over a communications medium, said digital signal being arranged as a sequence of frames, the frames comprising a plurality of lines of data, the beginning of each frame being indicated by a frame sync word and the beginning of each line being indicated by a horizontal sync byte, said data being interleaved prior to transmission, said receiver comprising:
    tuner means for tuning said transmitted digital signal;
    demodulator means for demodulating said tuned digital signal;
    first error correction circuitry for correcting errors in said demodulated digital signal;
    sync recovery circuitry for locating said frame sync words and said horizontal sync bytes in said error corrected digital signal;
    deinterleaving circuitry for deinterleaving said error corrected digital signal; and
    second error correction circuitry for correcting errors in said deinterleaved digital signal,
    wherein said sync recovery circuitry and said deinterleaving circuitry access a single memory during their respective operations.

2. A receiver in accordance with claim 1 wherein said sync recovery circuitry locates said horizontal sync byte by comparing the received digital data with a stored horizontal sync byte.

3. A receiver in accordance with claim 1 wherein said sync recovery circuitry locates said frame sync word by comparing the received digital data with a locally generated bit stream representative of the frame sync word.

4. A receiver in accordance with claim 1 wherein said first error correction circuitry comprises a Viterbi circuit.

5. A receiver in accordance with claim 1 wherein said second error correction circuitry comprises a Reed Solomon circuit.

6. A receiver in accordance with claim 1 wherein said memory includes a plurality of memory locations and said sync recovery circuitry and deinterleaving circuitry sequentially access the same locations in said memory.

7. A receiver for receiving a digital signal transmitted over a communications medium, said digital signal being arranged as a sequence of frames, the frames comprising a plurality of lines of data, the beginning of each frame being indicated by a frame sync word and the beginning of each line being indicated by a horizontal sync byte, said data being interleaved prior to transmission, said receiver comprising:
    sync recovery circuitry for locating said frame sync words and said horizontal sync bytes in said digital signal; and
    deinterleaving circuitry for deinterleaving said digital signal,
    wherein said sync recovery circuitry and said deinterleaving circuitry access a single memory during their respectively operations.

8. A receiver in accordance with claim 7 where in said sync recovery circuitry locates said horizontal sync byte by comparing the received digital data with a stored horizontal sync byte.

9. A receiver in accordance with claim 7 where said sync recovery circuitry locates said frame sync word by comparing the received digital data with a locally generated bit stream representative of the frame sync word.

10. A receiver in accordance with claim 7 wherein said memory includes a plurality of memory locations and said sync recovery circuitry and said deinterleaving circuitry sequentially access the same memory locations in said memory.

11. A method of receiving and processing a digital signal transmitted over a communications medium, said digital signal being arranged as a sequence of frames, the frames comprising a plurality of lines of data, the beginning of each frame being indicated by a frame sync word and the beginning of each line being indicated by a horizontal sync byte, said data being interleaved prior to transmission, said method comprising:
    tuning said transmitted digital signal;
    demodulating said tuned digital signal;
    correcting errors in said demodulated signal;
    locating the frame sync words and horizontal sync bytes in said error corrected digital signal;
    deinterleaving said digital signal; and
    correcting errors in said deinterleaved digital signal,
    wherein the step of locating the horizontal sync bytes comprises storing data to and reading data from a memory and said deinterleaving process comprises storing data to and reading data from said memory.

12. A method according to claim 11 wherein said step of correcting errors in said demodulated signal comprises passing said demodulated signal through a Viterbi circuit.

13. A method according to claim 11 wherein said step of correcting errors in said deinterleaved digital signal comprises passing said deinterleaved data through a Reed Solomon circuit.

14. A method according to claim 11 wherein said step of locating said horizontal sync bytes comprises comparing said received digital data with a stored representation of said horizontal sync byte.

15. A method according to claim 11 wherein said step of locating the horizontal sync bytes comprises storing data to and reading data from a first set of memory locations and said deinterleaving process comprises storing data to and reading data from a second set of memory locations, said first set of memory locations and said second set of memory locations having at least one memory location in common.

16. A method according to claim 11 wherein said step of locating said frame sync words comprises:
    generating a bit stream representing said frame sync word;
    comparing said received digital data with said generated bit stream.

17. A method of receiving and processing a digital signal transmitted over a communications medium, said digital signal being arranged as a sequence of frames, the frames comprising a plurality of lines of data, the beginning of each frame being indicated by a frame sync word and the beginning of each line being indicated by a horizontal sync byte, said data being interleaved prior to transmission, said method comprising:

locating the frame sync words and horizontal sync bytes in said interleaved digital signal; and deinterleaving said digital signal; and wherein the step of locating the horizontal sync bytes comprises storing data to and reading data from a memory and said deinterleaving process comprises storing data to and reading data from said memory.

18. A method according to claim 17 wherein said step of locating said horizontal sync bytes comprises comparing said received digital data with a stored representation of said horizontal sync byte.

19. A method according to claim 17 wherein said step of locating said frame sync words comprises:

generating a bit stream representing said frame sync word; and comparing said received digital data with said generated bit stream.

20. A method according to claim 17 wherein said step of locating the horizontal sync bytes comprises storing data to and reading data from a first set of memory locations and said deinterleaving process comprises storing data to and reading data from a second set of memory locations, said first set of memory locations and said second set of memory locations having at least one memory location in common.

21. A receiver in accordance with claim 1, wherein said interleaved data is interleaved in accordance with a first predetermined algorithm and said deinterleaving circuitry deinterleaves said interleaved digital signal according to a second predetermined algorithm.

22. A receiver in accordance with claim 7, wherein said interleaved data is interleaved in accordance with a first predetermined algorithm and said deinterleaving circuitry deinterleaves said interleaved digital signal according to a second predetermined algorithm.

23. A method in accordance with claim 11, wherein said interleaved data is interleaved in accordance with a first predetermined algorithm and said deinterleaving step deinterleaves said interleaved digital signal according to a second predetermined algorithm.

24. A method in accordance with claim 17, wherein said interleaved data is interleaved in accordance with a first predetermined algorithm and said deinterleaving step deinterleaves said interleaved digital signal according to a second predetermined algorithm.

* * * * *